US007656355B2

(12) United States Patent
Hsin

(10) Patent No.: US 7,656,355 B2
(45) Date of Patent: Feb. 2, 2010

(54) STYLUS ARRANGED WITH ANTENNA AND PORTABLE WIRELESS COMMUNICATION DEVICE HAVING THE SAME

(75) Inventor: Yite Hsin, Taipei County (TW)

(73) Assignees: Giga-Byte Communications Inc., Taipei County (TW); Giga-Byte Technology Co., Ltd., Taipei (TW)

( * ) Notice: Subject to any disclaimer, the term of this patent is extended or adjusted under 35 U.S.C. 154(b) by 3 days.

(21) Appl. No.: 11/898,681

(22) Filed: Sep. 14, 2007

(65) Prior Publication Data

US 2009/0073056 A1 Mar. 19, 2009

(51) Int. Cl.
*H01Q 1/10* (2006.01)
*H01Q 1/24* (2006.01)
*H04M 1/00* (2006.01)

(52) U.S. Cl. ........................ 343/702; 343/900; 343/901; 455/575.7

(58) Field of Classification Search ................. 343/702, 343/900–901; 455/575.7
See application file for complete search history.

(56) References Cited

U.S. PATENT DOCUMENTS 5,739,793 A 4/1998 Adachi
5,949,377 A 9/1999 Matsumoto et al.
6,262,684 B1 * 7/2001 Stewart et al. .............. 343/702
6,275,193 B1 8/2001 Nilsen et al.
6,353,414 B1 3/2002 Jones et al.
6,480,159 B1 11/2002 Hsu
2007/0024507 A1 * 2/2007 Kasamatsu et al. .......... 343/702
2008/0094292 A1 * 4/2008 Su ............................ 343/702

FOREIGN PATENT DOCUMENTS

TW M304787 1/2007

* cited by examiner

*Primary Examiner*—Rexford N Barnie
*Assistant Examiner*—Thienvu V Tran
(74) *Attorney, Agent, or Firm*—Rosenberg Klein & Lee

(57) ABSTRACT

A portable wireless communication device has a stylus and a main body. The stylus includes a pen tube and an antenna. The antenna is containable in the pen tube and separable from the pen tube. A portable wireless communication device includes a circuit board arranged in the main body, a containing groove and an antenna groove formed in the main body. The circuit board has a wireless communication unit. The containing groove is configured for containing the stylus. The antenna groove is configured for containing the antenna, and the antenna connects electrically to the wireless communication unit of the circuit board when the antenna is contained in the antenna groove.

13 Claims, 4 Drawing Sheets

STYLUS ARRANGED WITH ANTENNA AND PORTABLE WIRELESS COMMUNICATION DEVICE HAVING THE SAME

FIELD OF THE INVENTION

The present invention relates to technologies of portable wireless communication devices, and more specifically, to a PDA (personal digital assistant) having a stylus arranged with an antenna.

DESCRIPTION OF THE RELATED ART

U.S. Pat. No. 5,739,793 discloses a mobile communication information terminal apparatus. A preferred embodiment thereof includes a main body having an antenna groove. An antenna pen can be used as an antenna or a stylus. If the antenna pen is inserted into the antenna groove, the antenna pen is used as the antenna. When the antenna pen is used as the stylus, the antenna pen can not be used as the antenna. Therefore, the antenna pen only can be used as one of the antenna and the stylus at the same time. That is not convenient.

In another preferred embodiment thereof, another antenna is mounted on the main body for receiving signals when the antenna pen is used as the stylus to input data. Obviously, this preferred embodiment must have an antenna pen and an antenna. Therefore, more space of the main body will be occupied. Moreover, the receiving effect of the antenna is not good enough.

Another U.S. Pat. No. 6,353,414 discloses a portable information device (PID). The portable information device includes a main body and two styluses. Two grooves are arranged at sides of the main body respectively to contain the two styluses. One stylus has an antenna therein to be contained in the groove for being used as the antenna. The antenna can be partly drawn out from the groove for transmitting signals. However, the antenna is just bar with a constant length, not like a telescopic antenna which is extendable. Another stylus is used to control a display to input data. Therefore, the PID needs two styluses to receive signals and input data. Furthermore, two styluses cannot be combined with each other, thus more space will be occupied.

Taiwan Patent No. M261931 discloses a mobile phone having a stylus. An antenna is not contained in the stylus, but connects to one end of the stylus. When the stylus is contained in a groove, the antenna is out of the main body of the mobile phone. Therefore, it influences the appearance of the mobile phone, and is not convenient to carry. Furthermore, since the antenna is short, the receiving effect of the antenna is limited.

What are needed are a stylus and a wireless communication device having the same, which can solve the above problems.

BRIEF SUMMARY

The present invention provides a portable wireless communication device, which has a stylus that can be used for receiving signals and inputting data to save space.

A stylus, in accordance with a preferred embodiment of the present invention, includes a pen tube and an antenna. The antenna is containable in the pen tube and can be separated from the pen tube. A portable wireless communication device includes a circuit board, a containing groove and an antenna groove. The circuit board has a wireless communication unit. The containing groove is configured for containing the stylus. The antenna groove is configured for containing the antenna, and the antenna connects electrically to the wireless communication unit of the circuit board when the antenna is contained in the antenna groove.

The stylus can be separated into the antenna and the touch pen, therefore, the antenna can be used to receive signals and the pen can be used to input data at a same time.

The antenna is a telescopic antenna and is extendable to a length to receiving TV signals, therefore, it saves additional outer antenna, and saves space.

Since the antenna is contained in the pen tube and is telescopic, it saves more space.

Preferably, the antenna is rotatable in many directions to receiving optimal signals.

Other objects, advantages and novel features of the invention will become more apparent from the following detailed description when taken in conjunction with the accompanying drawings, in which:

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe a preferred embodiment of the present stylus and portable wireless communication device, in detail.

Figure 1:
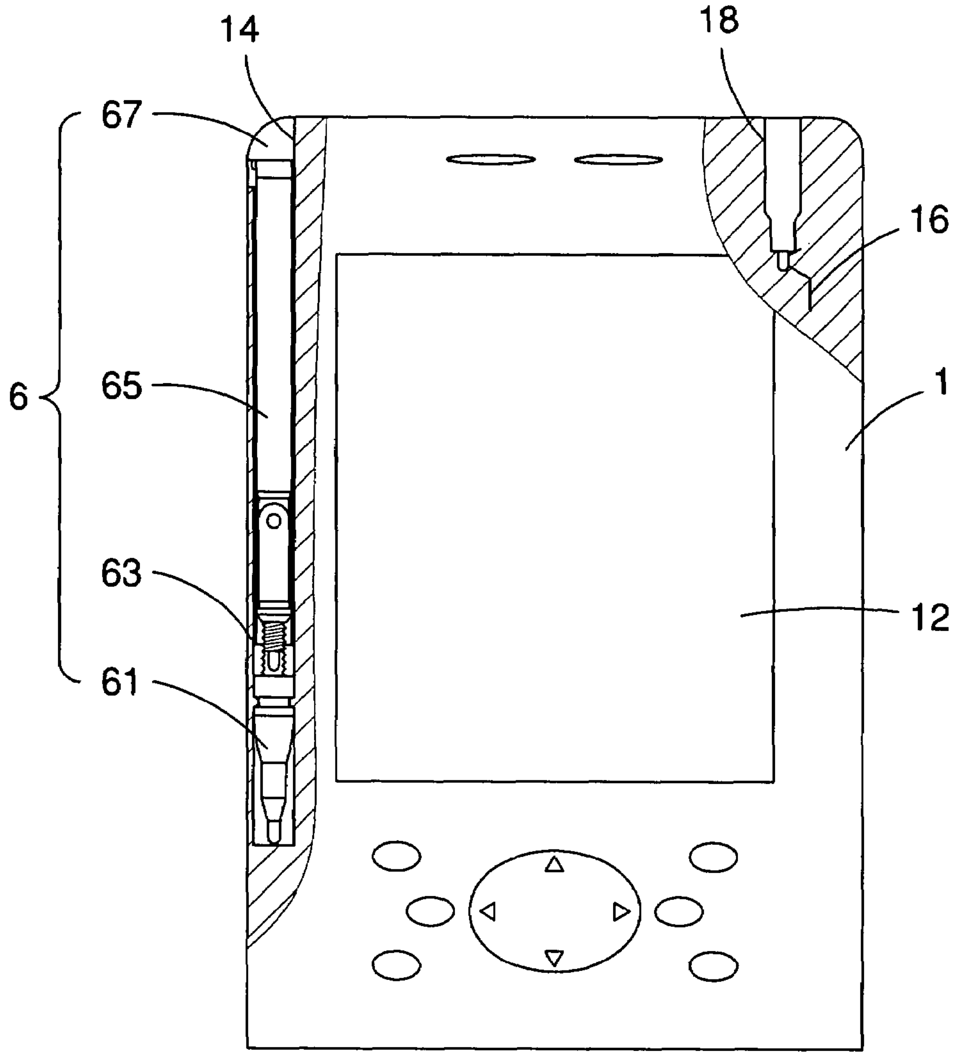
FIG. 1 is a schematic view of a personal digital assistant of a preferred embodiment of the present invention.
Figure 2:
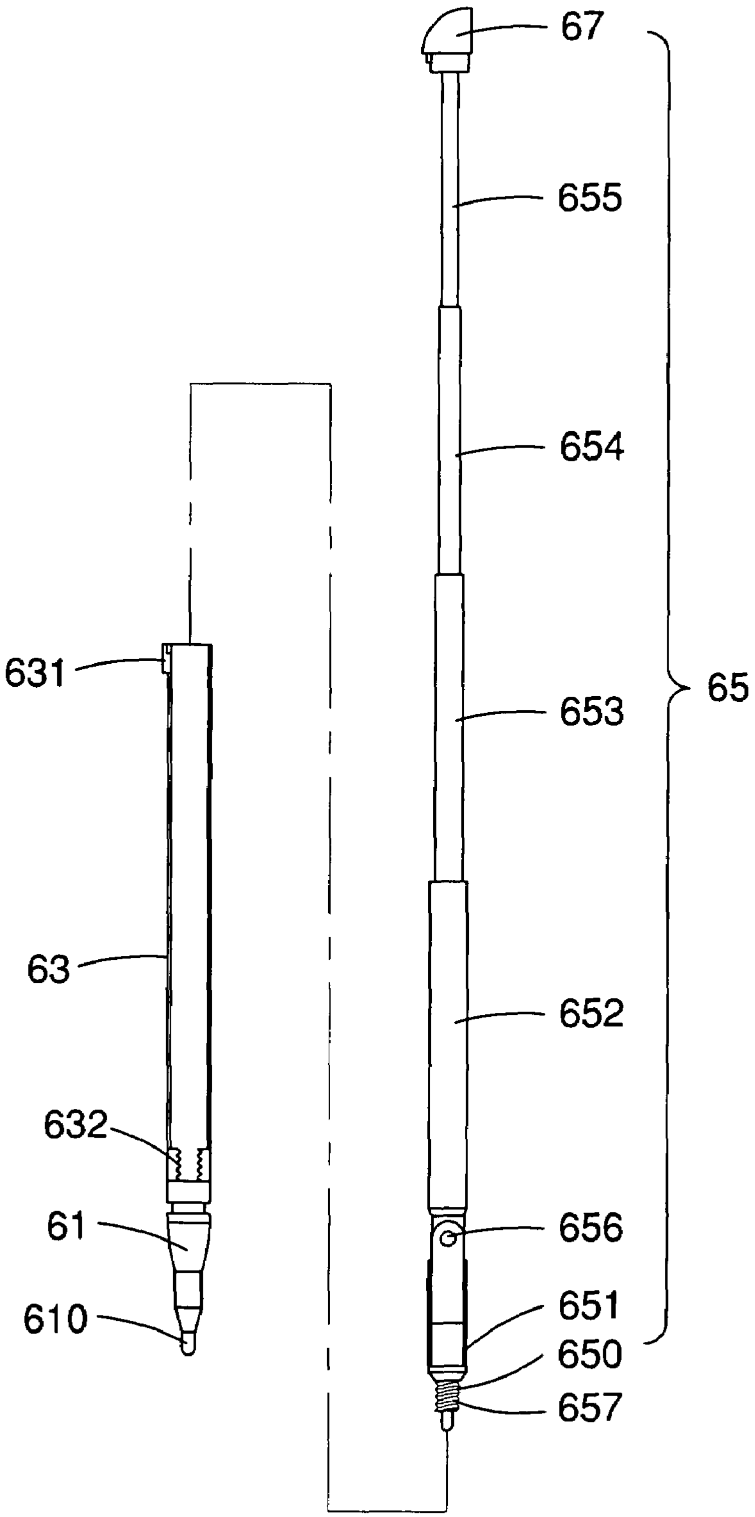
FIG. 2 is a schematic, exploded view of a stylus of the personal digital assistant.
Figure 3:
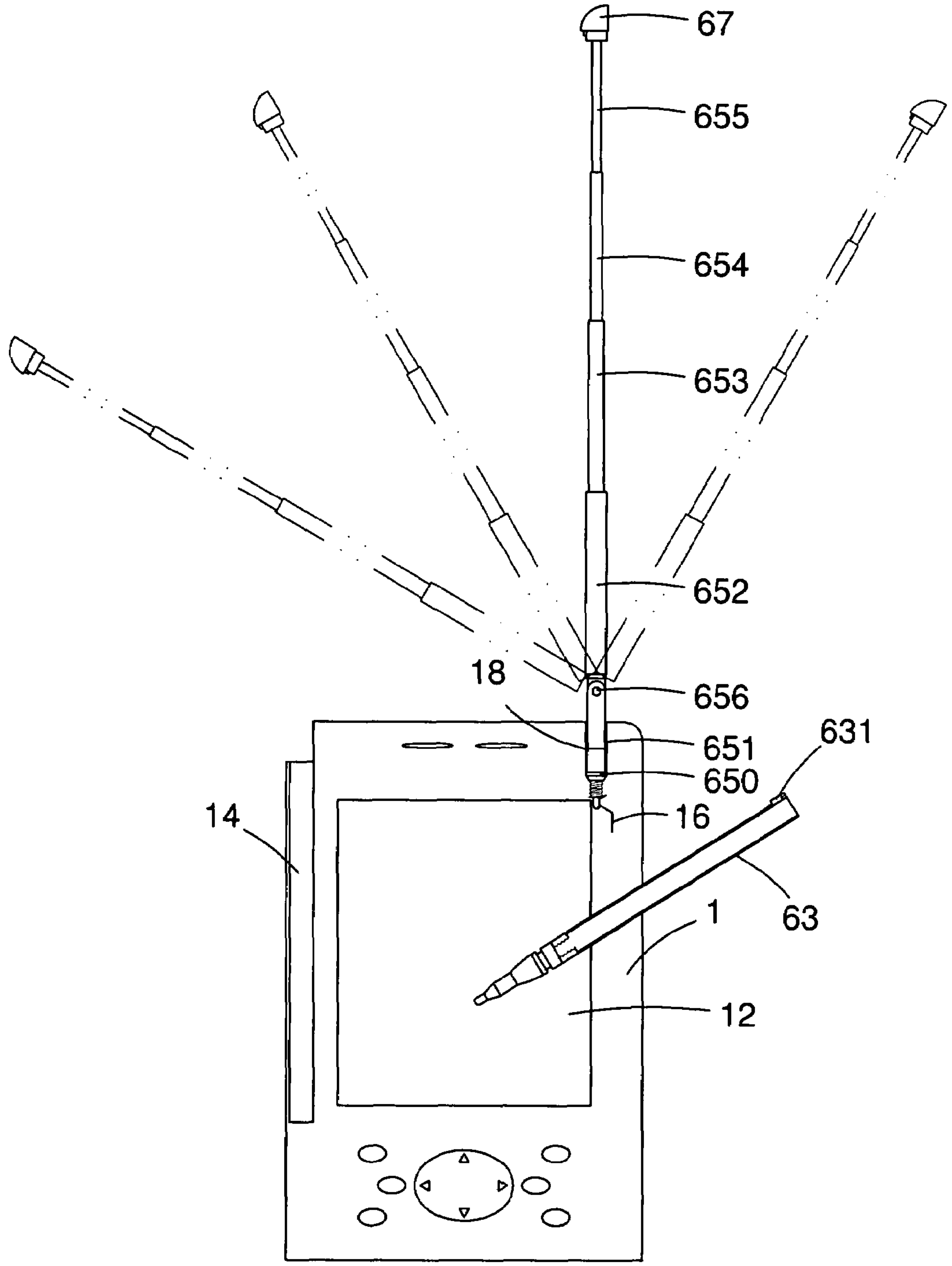
FIG. 3 is a schematic view of rotating the stylus.

Referring to FIGS. 1 to 3, a portable wireless communication device in accordance with a preferred embodiment of the present invention is shown. The portable wireless communication device, for example a PDA or a smart phone, includes a main body 1 and a stylus 6.

The main body 1 includes a circuit board (not shown), a display 12, a containing groove 14 and an antenna groove 18. The circuit board is arranged in the main body 1 and includes a wireless communication unit (not shown). The wireless communication unit includes an electrically conducting elastic sheet 16 extending to the antenna groove 18. A1

Referring to FIG. 2, the stylus 6 includes a pen head 61, a pen tube 63, an antenna 65, a pen tail 67 and a protrusion 631. The pen head 61 is connected with one end of the pen tube 63 and includes a penpoint 610 to touch the display 12. The pen tube 63 can be contained in the containing groove 14, and the antenna 65 is separably contained in the pen tube 63. Therefore, the antenna 65 can be separated from the pen tube 63 and inserted into the antenna groove 18 to receiving signals. In this exemplary embodiment, the antenna 65 is a telescopic antenna. The telescopic antenna 65 includes a last electrically conducting tube 655 connected to the pen tail 67 of the stylus 6. The protrusion 631 is arranged on an outer surface of one end of the pen tube 63. When the telescopic antenna 65 is contained in the pen tube 63, the pen tail 67 closes to the protrusion 631. The antenna 65 can be taken out freely from the pen tube 63 by using the pen tail 67. Furthermore, the pen tube 63 can be taken out freely from the main body 1 by using the protrusion 631.

The stylus 6 can be contained completely in the containing groove 14. Alternatively, referring to FIGS. 1 to 3, the stylus 6 can be taken out from the containing groove 14 for using. When the stylus 6 needs to receive signals, the antenna 65 is taken out from the pen tube 63 of the stylus 6, and inserted into the antenna groove 18. The antenna 65 contacts with the electrically conducting elastic sheet 16 to electrically conduct to the wireless communication unit of the circuit board of the main body 1 for receiving signals. On the other hand, the other parts of the stylus 6, such as the pen head 61 and the pen tube 63, can be used to input data on the display 12. Compared with the conventional art, the antenna of the stylus 6 of the present invention can be contained in the pen tube, and therefore, it saves space.

Referring to FIG. 2, the telescopic antenna 65 includes an antenna head 650, rotating joint 656, a first conducting tube 651 and a plurality of conducting tubes. The antenna head 650 connects to one end of the first conducting tube 651, and includes an outer screw thread 657 formed thereon. The pen tube 63 also includes an inner screw thread 632 formed therein adjacent to the pen head 61, which is corresponding to the outer screw thread 657. Therefore, the antenna 65 can be fixed by the inner and outer screw threads when it is contained in the pen tube 63. The plurality of conducting tubes include a second conducting tube 652, a third conducting tube 653, and a fourth conducting tube 654. The plurality of conducting tubes connect with each other to extend in a direction. Therefore, the antenna can be extended to receive TV signals of high frequency VHF or super high frequency UHF. The portable wireless communication device can receive wireless TV signals to be used to display digital TV programs by the antenna 65 and the wireless communication unit.

Figure 4:
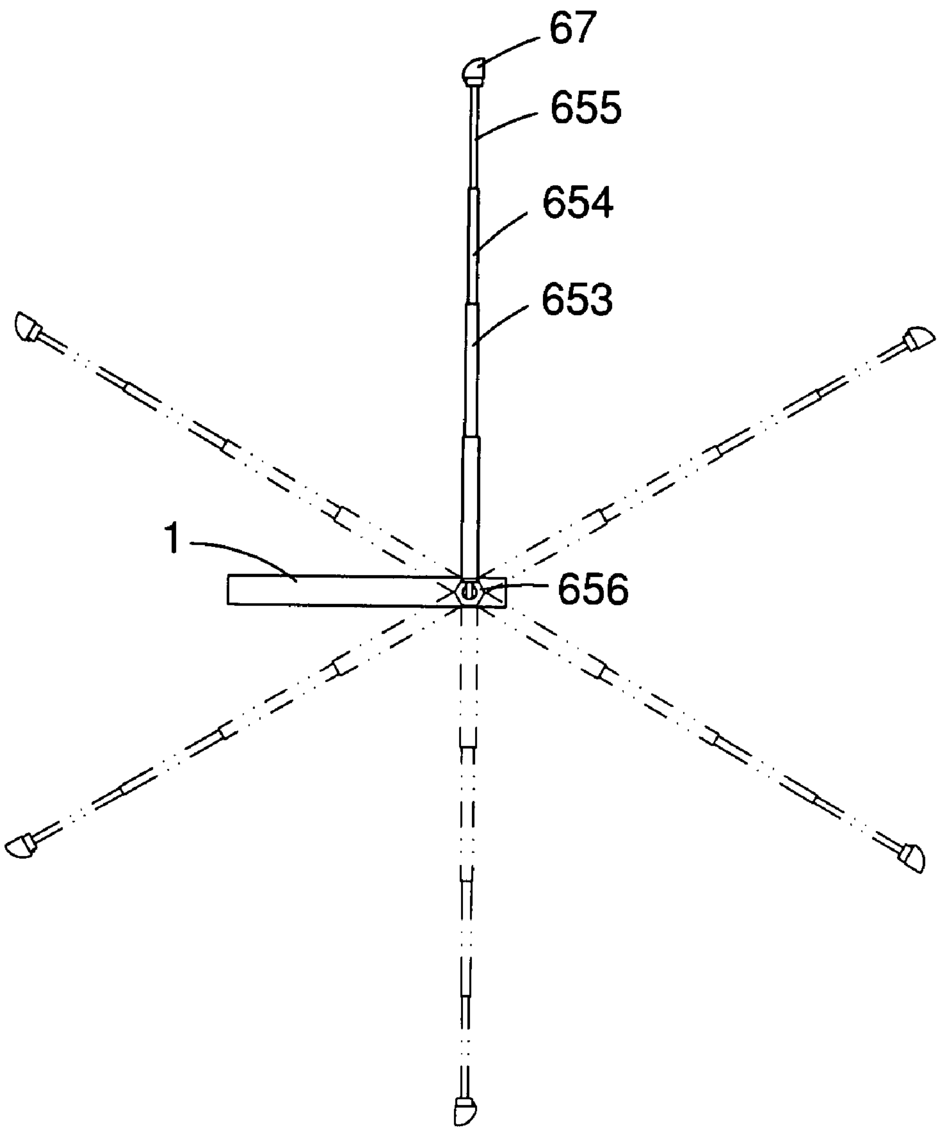
FIG. 4 is another schematic view of rotating the stylus.

Preferably, one end of the first conducting tube 651 of the antenna connects to the antenna head 650. The rotating joint 656 is telescopically movably received in the first conducting tube 651 and connects between the first conducting tube 651 and the second conducting tube 652 to make the second conducting tube 652 rotatable on the first conducting tube 651, such as facing a first direction to rotate 180 degrees (as shown in FIG. 3), and facing a second direction to rotate 360 degrees (as shown in FIG. 4). Similarly, the third to fifth conducting tubes 653 to 655 can be contained respectively in the second to fourth conduction tubes 652 to 654 to be collected conveniently, and can be pulled to extend the length of the antenna for receiving better signals of the high frequency or super high frequency.

As described above, when the portable wireless communication device is not used, the stylus 6 is contained in the containing groove 14 of the main body 1 as shown in FIG. 1, thus, it is convenient for carrying. On the other hand, when the portable wireless communication device is used, the stylus 6 is taken out from the containing groove 14 to be separated into the antenna and the pen for using. Alternatively, only the antenna 65 is taken out from the pen tube 63 to insert into the antenna groove 18 and to be extended and rotated to a preferable direction for obtaining the optimal receiving effect. Thus, the portable wireless communication device can be used as a portable TV.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A stylus for a communication device comprising:

a stylus pen tube detachable from the communication device;

a pen head secured on one end of the stylus pen tube; and an antenna telescopically stowed in the stylus pen tube, the antenna being separable from the stylus pen tube to engage an antenna groove of the communication device independent of the stylus pen tube.

2. The stylus as claimed in claim 1, wherein the antenna is a telescopic antenna.

3. The stylus as claimed in claim 2, wherein the telescopic antenna comprises a rotating joint, a first conducting tube and a second conducting tube, the rotating joint connects between the first conducting tube and the second conducting tube to make the second conducting tube rotatable on the first conducting tube.

4. The stylus as claimed in claim 3, wherein the rotating joint is telescopically movably received in the first conducting tube.

5. The stylus as claimed in claim 4, wherein the telescopic antenna further comprises an antenna head connecting to one end of the first conducting tube and having an outer screw thread formed thereon, the stylus pen tube includes an inner screw thread adjacent to the pen head to be coupled with the outer screw thread.

6. A portable wireless communication device, comprising:

a stylus having a pen tube and an antenna, the stylus being detachable from the communication device the antenna being telescopically stowed in the pen tube, the antenna being separable from the pen tube;

a main body having a circuit board arranged therein, a containing groove and an antenna groove formed therein, the circuit board having a wireless communication unit, the containing groove being configured for containing the stylus, the antenna groove being configured for containing the antenna, and the antenna being electrically connected to the wireless communication unit of the circuit board when the antenna is withdrawn from the pen tube and engaged in the antenna groove independent of the pen tube for separate coupling to the circuit board apart from the pen tube.

7. The portable wireless communication device as claimed in claim 6, wherein the wireless communication unit comprises a conducting elastic sheet, the conducting elastic sheet extends to the antenna groove, and when the antenna is contained in the antenna groove, the antenna contacts with the conducting elastic sheet.

8. The portable wireless communication device as claimed in claim 7, wherein the stylus further comprises a pen tail and a protrusion, the pen tail connects to the end of the antenna, the protrusion is arranged at an outer surface of the end of the pen tube, and when the antenna is contained in the pen tube, the pen tail closes to the protrusion.

9. The portable wireless communication device as claimed in claim 7, wherein the antenna is a telescopic antenna.

10. The portable wireless communication device as claimed in claim 9, wherein the telescopic antenna comprises a rotating joint, a first conducting tube and a second conducting tube, the rotating joint connects between the first conducting tube and the second conducting tube to make the second conducting tube rotatable on the first conducting tube.

11. The portable wireless communication device as claimed in claim 10, wherein the rotating joint is telescopically movably received in the first conducting tube.

12. The portable wireless communication device as claimed in claim 11, wherein the telescopic antenna further comprises an antenna head connecting to one end of the first conducting tube and having an outer screw thread formed thereon, the pen tube includes an inner screw thread adjacent to the pen head to be coupled with the outer screw thread.

13. The portable wireless communication device as claimed in claim 12, wherein the stylus further comprises a pen tail and a protrusion, the pen tail connects to the end of the antenna, the protrusion is arranged at an outer surface of the end of the pen tube, and when the antenna is contained in the pen tube, the pen tail closes to the protrusion.

* * * * *